(12) United States Patent
Wang

(10) Patent No.: US 11,870,732 B2
(45) Date of Patent: Jan. 9, 2024

(54) METHODS AND NODES FOR ACTIVATION OR DEACTIVATION OF A CARRIER IN A COMMUNICATION NETWORK SUPPORTING CARRIER AGGREGATION

(71) Applicant: Telefonaktiebolaget LM Ericsson (publ), Stockholm (SE)

(72) Inventor: Jun Wang, Nanjing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1166 days.

(21) Appl. No.: 16/468,052

(22) PCT Filed: Jan. 29, 2018

(86) PCT No.: PCT/IB2018/050531
§ 371 (c)(1),
(2) Date: Jun. 10, 2019

(87) PCT Pub. No.: WO2018/142264
PCT Pub. Date: Aug. 9, 2018

(65) Prior Publication Data
US 2023/0069144 A1   Mar. 2, 2023

Related U.S. Application Data

(60) Provisional application No. 62/453,096, filed on Feb. 1, 2017.

(51) Int. Cl.
*H04L 5/00* (2006.01)
(52) U.S. Cl.
CPC .......... *H04L 5/0098* (2013.01); *H04L 5/0055* (2013.01)
(58) Field of Classification Search
CPC ...... H04L 5/0098; H04L 5/0055; H04L 5/001
(Continued)

(56) References Cited

U.S. PATENT DOCUMENTS

2013/0259011 A1* 10/2013 Nakashima ........... H04W 52/48
                                                                 370/336
2014/0226581 A1*  8/2014 Nam ..................... H04L 1/1861
                                                                 370/329
(Continued)

FOREIGN PATENT DOCUMENTS

CN   102088433 A   6/2011
CN   102149208 A   8/2011
(Continued)

OTHER PUBLICATIONS

Interational Search Report PCT/IB2018/050531.
(Continued)

*Primary Examiner* — Mang Hang Yeung
(74) *Attorney, Agent, or Firm* — Sage Patent Group

(57) ABSTRACT

A method in a User Equipment (UE) for activation or deactivation of a carrier in a communication network supporting carrier aggregation is provided. The method comprises: receiving a control signal for a transmission of a carrier activation or deactivation message command, the control signal including an indication of a first resource for the UE to transmit a feedback message to a network node; receiving a carrier activation or deactivation message; wherein the carrier activation or deactivation message comprises an indication of a second resource for the UE to transmit the feedback message to the network node; decoding the received carrier activation or deactivation message; and sending the feedback message using one of the first resource and the second resource based at least on a result of the decoding of the carrier activation or deactivation message. A UE for performing this method is also provided.

20 Claims, 12 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2014/0301290 A1* | 10/2014 | He | H04L 65/611 370/329 |
| 2015/0049682 A1* | 2/2015 | Seo | H04W 72/21 370/329 |
| 2015/0131565 A1* | 5/2015 | Nakashima | H04L 5/0055 370/329 |
| 2015/0195062 A1* | 7/2015 | Hwang | H04L 1/1861 370/329 |
| 2018/0115986 A1* | 4/2018 | Aiba | H04L 1/1861 |

FOREIGN PATENT DOCUMENTS

| | | |
|---|---|---|
| CN | 102948100 A | 2/2013 |
| EP | 2393334 A1 | 1/2011 |
| EP | 3 291 623 A1 | 3/2018 |
| UA | 98050 C2 | 4/2012 |
| WO | 2016/175172 A1 | 11/2016 |
| WO | 2016175172 A1 | 11/2016 |

OTHER PUBLICATIONS

3GPP TS 36.331 V15.5.1 (Apr. 2019) 3rd Generation Partnership Project; Technical Specification Group Radio Access Network; Evolved Universal Terrestrial Radio Access (E-UTRA); Radio Resource Control (RRC); Protocol specification (Release 15).
3GPP TS 36.213 V15.5.0 (Mar. 2019), 3rd Generation Partnership Project; Technical Specification Group Radio Access Network; Evolved Universal Terrestrial Radio Access (E-UTRA); Physical layer procedures (Release 15) (Submitted in documents Parts 1-7).
3GPP TS 36.212 V15.5.0 (Mar. 2019), 3rd Generation Partnership Project; Technical Specification Group Radio Access Network; Evolved Universal Terrestrial Radio Access (E-UTRA); Multiplexing and channel coding (Release 15).

* cited by examiner

METHODS AND NODES FOR ACTIVATION OR DEACTIVATION OF A CARRIER IN A COMMUNICATION NETWORK SUPPORTING CARRIER AGGREGATION

RELATED APPLICATIONS

The present application claims the benefits of priority of U.S. Provisional Patent Application No. 62/453,096, entitled "An optimized HARQ feedback method in downlink carrier aggregation", and filed at the United States Patent and Trademark Office on Feb. 1, 2017, the content of which is incorporated herein by reference.

TECHNICAL FIELD

The present description generally relates to an optimized HARQ feedback method in downlink carrier aggregation.

BACKGROUND

Long Term Evolution (LTE) Carrier Aggregation (CA) enables a network operator to combine radio channels within the same frequency band or across different bands to achieve much higher data rates and lower latency than otherwise would be possible. In principle, the LTE Advanced standard will allow for the aggregation of up to five carriers, each of up to 20 MHz, to achieve a total effective bandwidth of 100 MHz.

As such, in DownLink (DL) carrier aggregation (CA), a base station, such as an eNB, may schedule the DL data simultaneously in more than one DL carriers (serving cells) to a User Equipment (UE). However, the UE can only feedback the corresponding HARQ ACK/NACK bits on the primary cell. Considering that each DL carrier needs 1 or 2 bits, the total HARQ feedback bits can be up to 10 bits for 5 carriers in FDD, i.e. 5 (carriers) * 2 (CodeWord)=10. The HARQ feedback can be up to 40 bits for 5 carriers in TDD, i.e. 5 (carriers) * 2 (CodeWord) * 4 bundling SubFrame=40, which has greatly exceeded the current PUCCH format 1a/1b or 1b-cs capacity. To support such a large number of HARQ feedback bits, 3GPP introduced a new HARQ feedback bit format since Release 12.

In the new format, the HARQ feedbacks (1 or 2 bits based on the respective Transmission Mode) of each serving cell are concatenated into a bit sequence in ascendant order of serving cell index and then encoded into 48 bits modulated into 24 PSK symbols. On PUCCH, at most 5 CA-UEs' HARQ feedbacks are multiplexed into one UL RB resource through a length-5 orthogonal sequence, for example.

Each configured DL carrier has two states: deactivated and activated. When the eNB adds a new carrier through a RRCconnectionReconfig message, the carrier initially stays at the deactivated state. While the carrier is at the deactivated state, it cannot be used for DL scheduling and the UE cannot do blind detection of the DCI on the carrier's PDCCH. When certain conditions are met, such as there is enough data for transmission or a good SINR, the carrier is activated by the eNB through a MAC control element, then the UE starts to listen on its PDCCH for potential scheduling.

SUMMARY

According to 3GPP TS. 36.212, all the configured DL carriers (or serving cells) whether activated or deactivated, need to occupy the corresponding place-holder bits in the concatenated bit sequence for the HARQ feedback. As such, at least the following problems may be envisioned.

Some HARQ bit resources are wasted; and

Misalignment period of the number of configured carriers between the eNB and UE is generated.

Certain aspects and their embodiments of the present disclosure may provide solutions to these or other problems.

Embodiments of this disclosure specify a HARQ feedback bit sequence that allocates bits only to the activated carriers; it means that there is no place-holder bits allocated to the deactivated carriers anymore. They allow to improve the carrier activation or deactivation procedure through two methods:

[1] by providing two resources allowing the UE to intentionally select a specific resource to send the HARQ feedback to the network node, in response to the activation or deactivation command.

[2] by defining an uplink in-band signaling piggybacked in the user data transmission to indicate the latest status of all the configured carriers to eNB.

According to a first aspect, there is provided a method in a network node for activation or deactivation of a carrier in a communication network supporting carrier aggregation. The method comprises: sending a control signal to schedule a transmission of a carrier activation or deactivation message; wherein the control signal comprises an indication of a first resource for a User Equipment (UE) to transmit a feedback message to the network node; sending the carrier activation or deactivation message; wherein the carrier activation or deactivation message comprises an indication of a second resource for the UE to transmit the feedback message to the network node; in response to the sending of the activation and deactivation message, receiving the feedback message at the first and second resources; and decoding the feedback message based on power detection at the first and second resources.

According to a second aspect, there is provided a network node comprising a processing circuitry and a network interface connected thereto. The processing circuitry is configured to: send a control signal to schedule a transmission of a carrier activation or deactivation message; wherein the control signal comprises an indication of a first resource for a User Equipment (UE) to transmit a feedback message to the network node; send the carrier activation or deactivation message; wherein the carrier activation or deactivation message comprises an indication of a second resource for the UE to transmit the feedback message to the network node; in response to the sending of the activation and deactivation message, receive the feedback message at the first and second resources; and decode the feedback message based on power detection at the first and second resources.

According to a third aspect, there is provided a method in a User Equipment (UE) for activation or deactivation of a carrier in a communication network supporting carrier aggregation. The method comprises: receiving a control signal for a transmission of a carrier activation or deactivation message command, the control signal including an indication of a first resource for the UE to transmit a feedback message to a network node; receiving a carrier activation or deactivation message; wherein the carrier activation or deactivation message comprises an indication of a second resource for the UE to transmit the feedback message to the network node; decoding the received carrier activation or deactivation message and sending the feedback message using one of the first resource and the second resource based at least on a result of the decoding of the carrier activation or deactivation message.

According to a fourth aspect, there is provided a User Equipment (UE) comprising processing circuitry, and a network interface connected thereto. The processing circuitry is configured to: receive a control signal for a transmission of a carrier activation or deactivation message command, the control signal including an indication of a first resource for the UE to transmit a feedback message to a network node; receive a carrier activation or deactivation message; wherein the carrier activation or deactivation message comprises an indication of a second resource for the UE to transmit the feedback message to the network node; decode the received carrier activation or deactivation message; send the feedback message using one of the first resource and the second resource based at least on a result of the decoding of the carrier activation or deactivation message.

Certain embodiments of aspects of the present disclosure may provide one or more technical advantages, including:

The HARQ feedback bit sequence size is reduced and higher HARQ feedback accuracy is achieved.

The HARQ decoding failure, caused by the mismatch of the number of configured carriers between the eNB and UE during the carrier configuration procedure, is eliminated.

The BLER of the HARQ feedback is decreased.

The out-of-synchronization of the activated carrier number between the eNB and the UE is detected in real-time and the synchronization can be quickly resumed.

The embodiments are applicable to LTE and 5G, and are also backward compatible.

It is to be noted that any feature of any of the embodiments disclosed herein may be applied to any other embodiment, wherever appropriate. Likewise, any advantage of any of the embodiments may apply to the other embodiments, and vice versa. Certain embodiments may have some, or none of the above advantages. Other advantages will be apparent to persons of ordinary skill in the art. Other objectives, features and advantages of the enclosed embodiments will be apparent from the following description.

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

This summary is not an extensive overview of all contemplated embodiments, and is not intended to identify key or critical aspects or features of any or all embodiments or to delineate the scope of any or all embodiments. In that sense, other aspects and features will become apparent to those ordinarily skilled in the art upon review of the following description of specific embodiments in conjunction with the accompanying figures.

BRIEF DESCRIPTION OF THE DRAWINGS

Exemplary embodiments will be described in more detail with reference to the following figures, in which.

illustrates a schematic diagram of a network node according to another embodiment.

Figure 9:
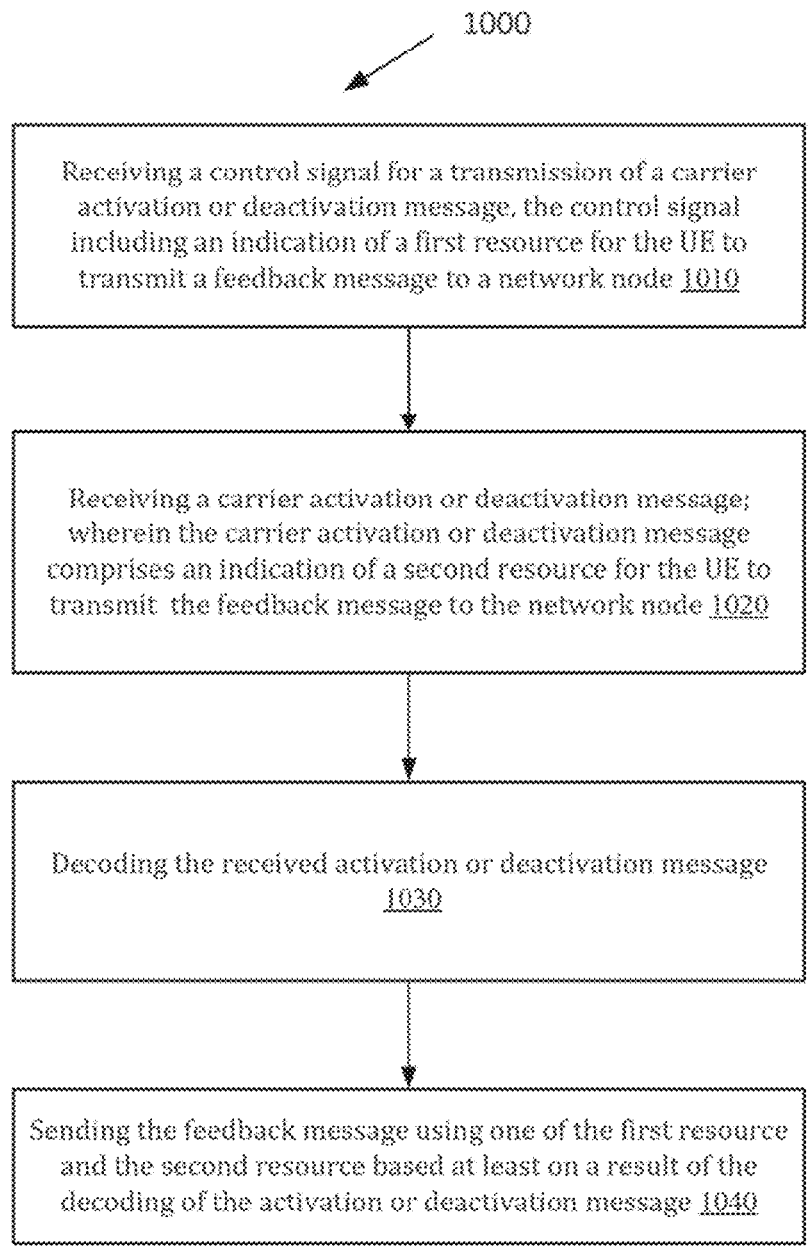

FIG. 9 illustrates a flow chart of a method in a user equipment, according to an embodiment.

Figure 10:
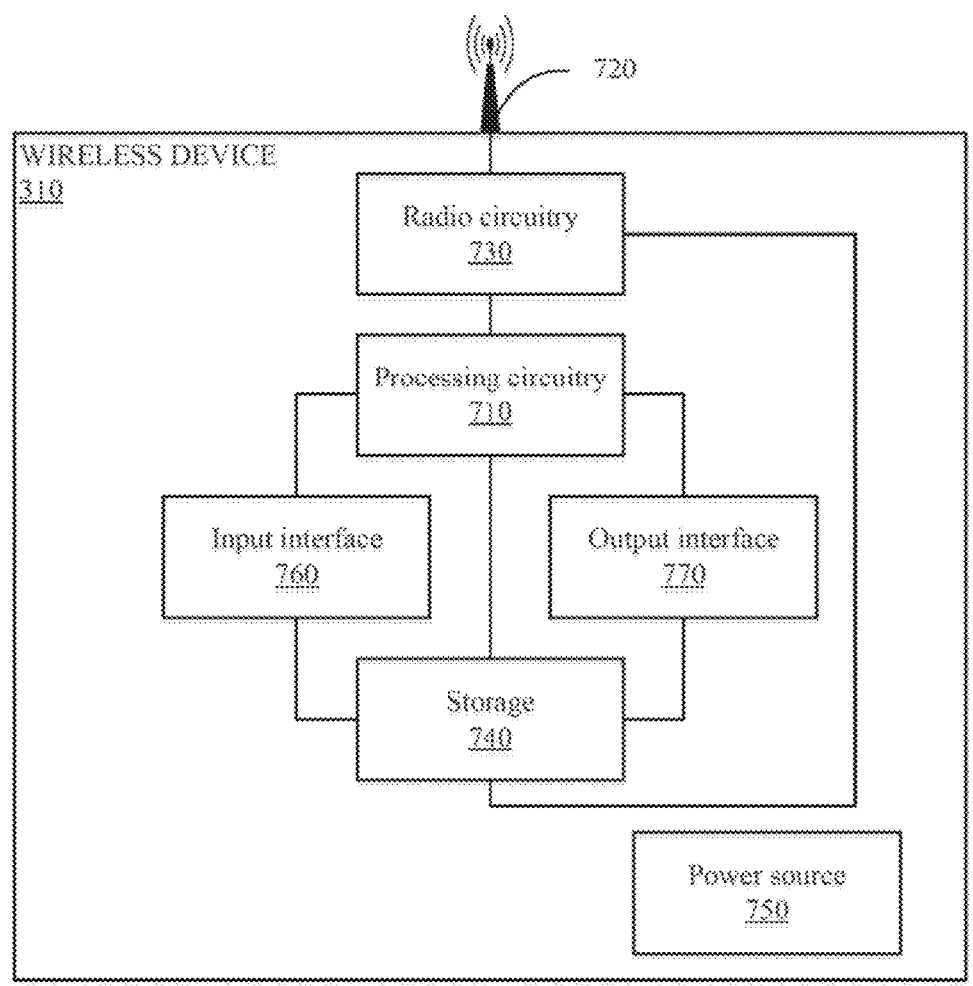

FIG. 10 illustrates a wireless device according to an embodiment.

Figure 11:
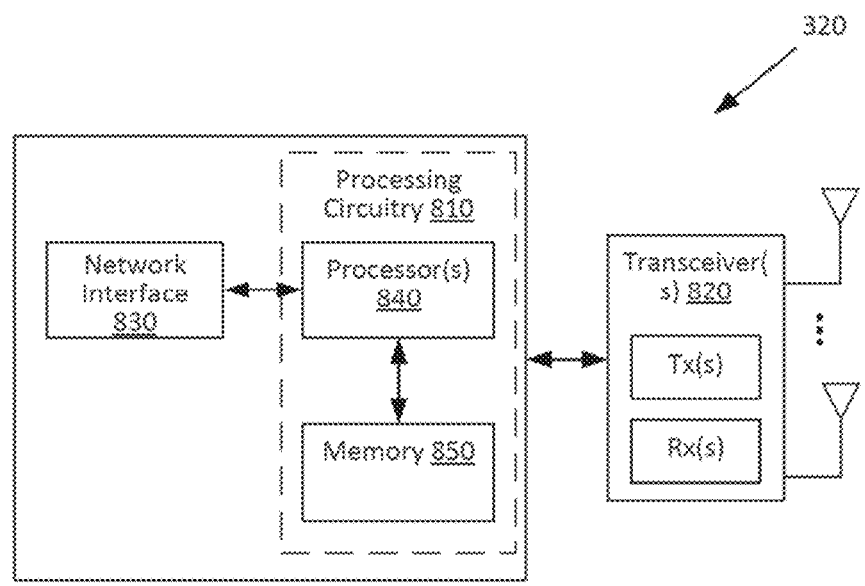

FIG. 11 illustrates a schematic diagram of a network node according to an embodiment.

Figure 12:
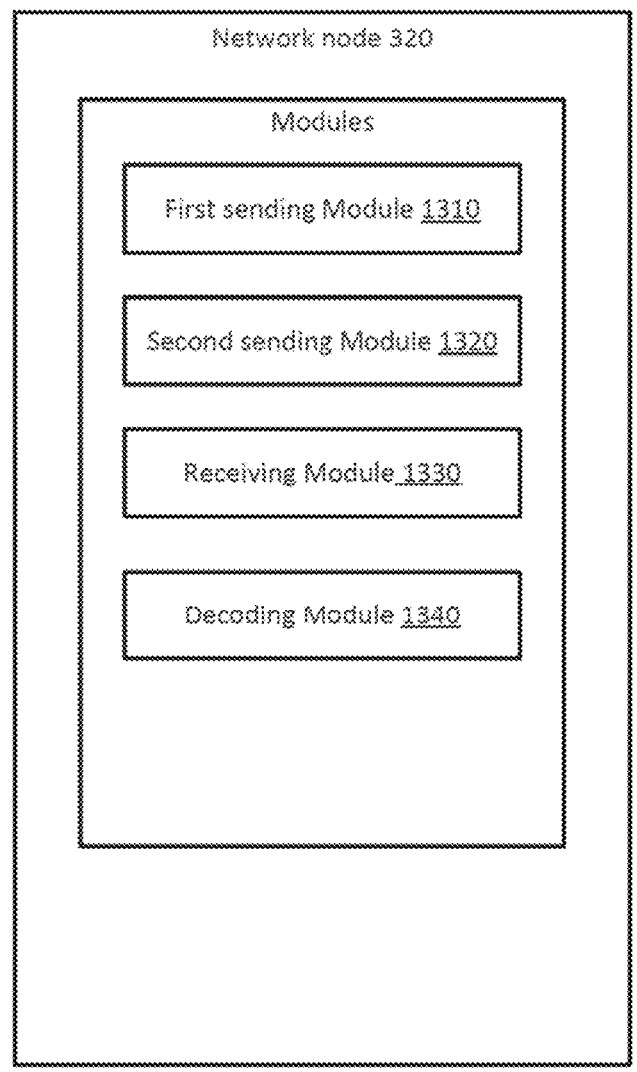

FIG. 12 illustrates a schematic diagram of a network node according to another embodiment.

Figure 13:
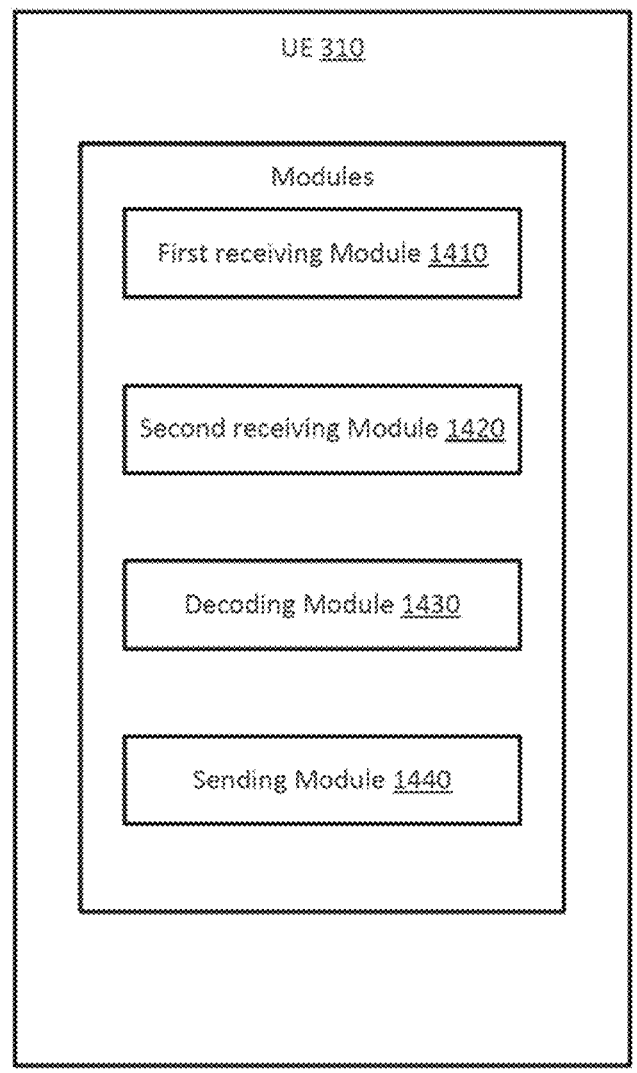

FIG. 13 illustrates a schematic diagram of a wireless device according to another embodiment.

Figure 14:
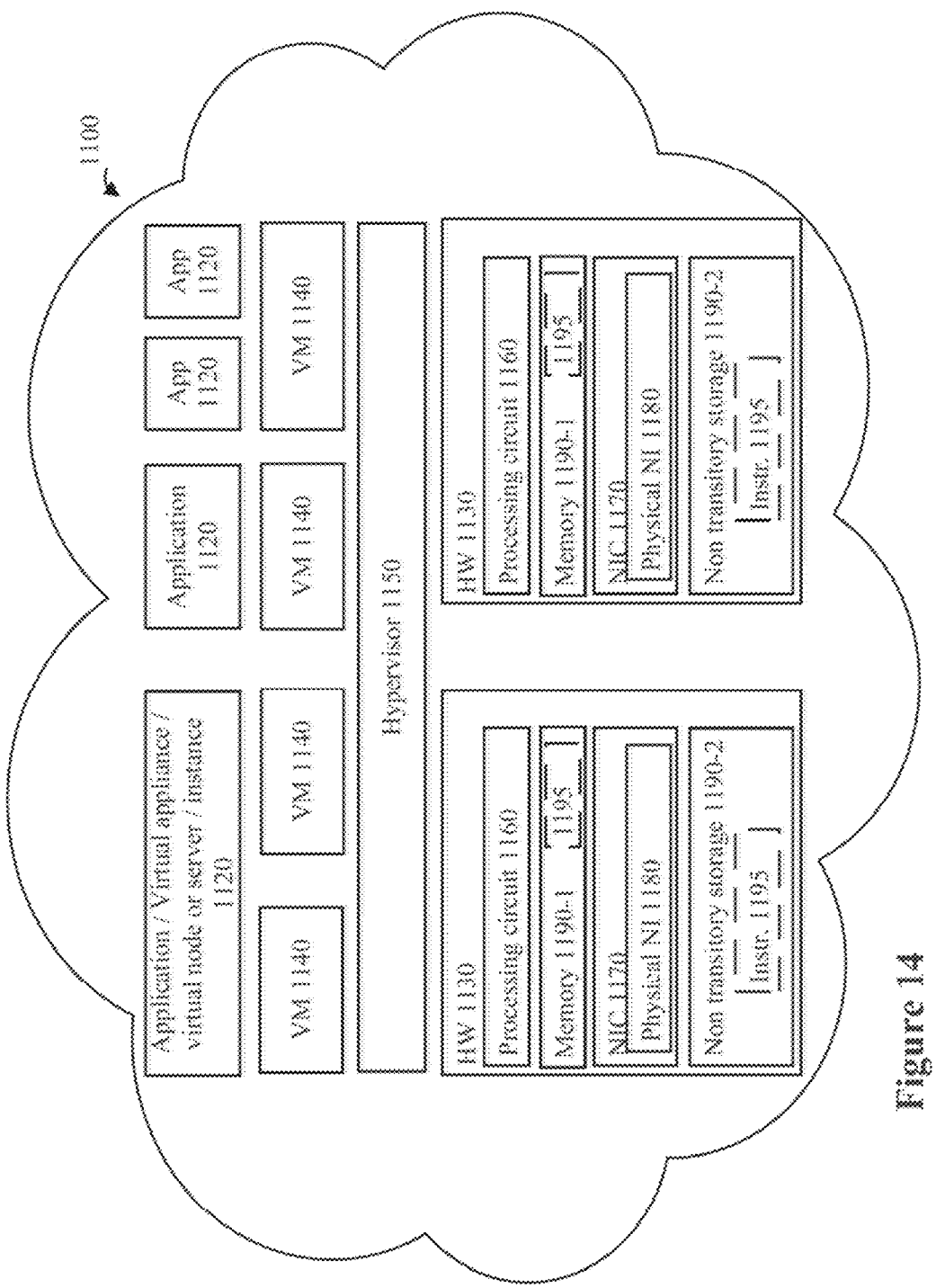

FIG. 14 illustrates a cloud computing environment for performing the methods of FIGS. 9 and 10.

DETAILED DESCRIPTION

The various features and embodiments will now be described with reference to the figures to fully convey the scope of the disclosure to those skilled in the art.

Many aspects will be described in terms of sequences of actions or functions. It should be recognized that in some embodiments, some functions or actions could be performed by specialized circuits, by program instructions being executed by one or more processors, or by a combination of both.

Further, some embodiments can be partially or completely embodied in the form of computer readable carrier or carrier wave containing an appropriate set of computer instructions that would cause a processor to carry out the techniques described herein.

In some alternate embodiments, the functions/actions may occur out of the order noted in the sequence of actions. Furthermore, in some illustrations, some blocks, functions or actions may be optional and may or may not be executed; these are generally illustrated with dashed lines.

Figure 1:
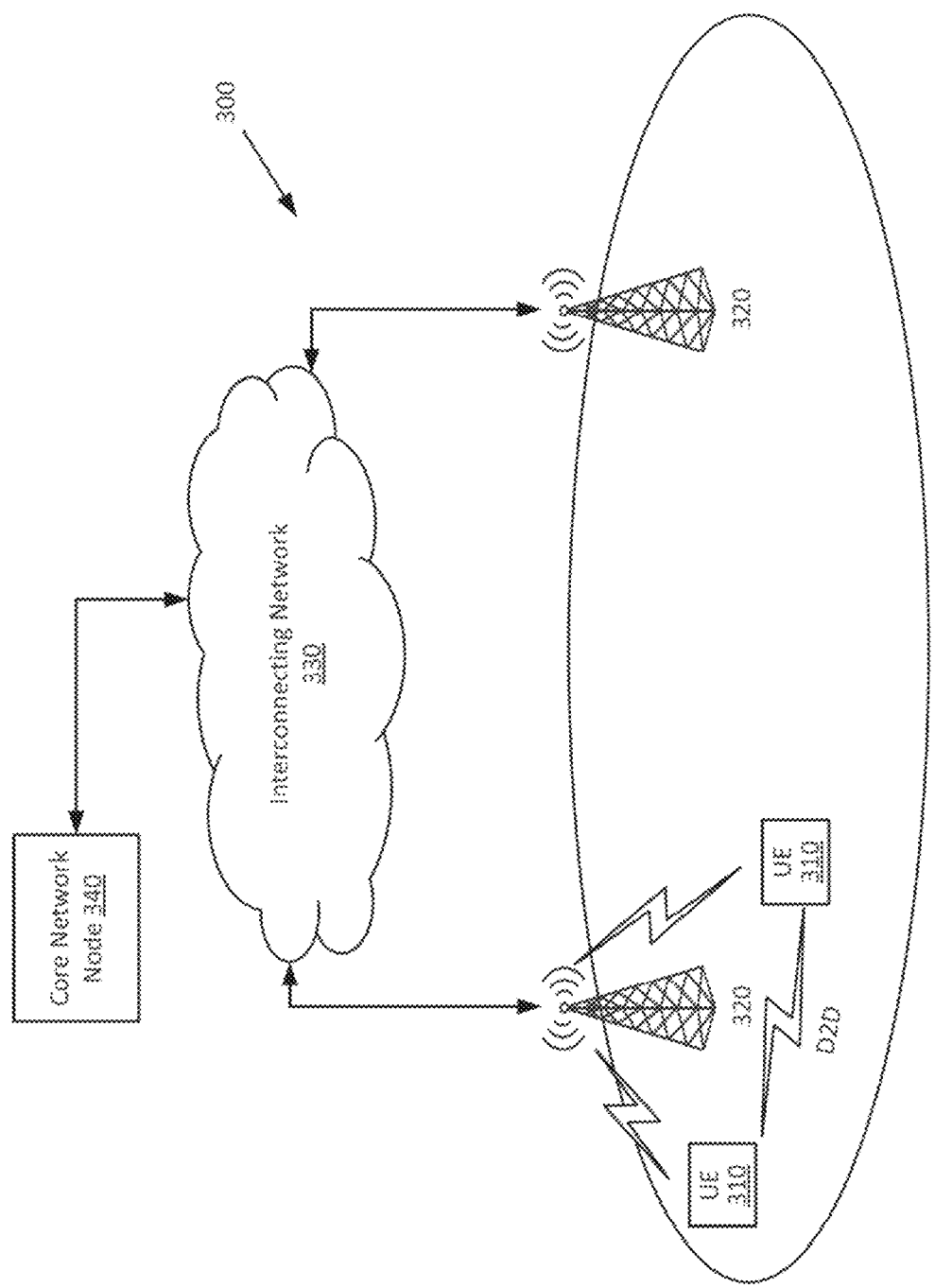
FIG. 1 illustrates a schematic diagram of a communication network.

The present disclosure contemplates that the various embodiments described herein may be applied to a variety of networks such as the one shown in FIG. 1.

FIG. 1 illustrates an example of a wireless communication network 300 that may be used for wireless communications. Wireless communication network 300 includes wireless devices 310 (e.g., user equipments, UEs) and a plurality of network nodes 320 (e.g., eNBs, gNBs, base stations, etc.) connected to one or more core network nodes 340 via an interconnecting network 330. Wireless devices 310 within a coverage area may each be capable of communicating directly with network nodes 320 over a wireless interface. In certain embodiments, wireless devices 310 may also be capable of communicating with each other via device-to-device (D2D) communication. In certain embodiments, network nodes 320 may also be capable of communicating with each other, e.g. via an interface (e.g. X2 in LTE or other suitable interface).

As an example, wireless device 310 may communicate with network node 320 over a wireless interface. That is, wireless device 310 may transmit wireless signals and/or receive wireless signals from network node 320. The wireless signals may contain voice traffic, data traffic, control signals, and/or any other suitable information. In some embodiments, an area of wireless signal coverage associated with a network node 320 may be referred to as a cell.

In some embodiments wireless device 310 may be interchangeably referred to by the non-limiting term user equipment (UE). Wireless device 310 can be any type of wireless device capable of communicating with network node or another UE over radio signals. The UE may also be radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE), etc. Example embodiments of a wireless device 310 are described in more detail below with respect to FIGS. 10 and 13.

In some embodiments, the "network node" can be any kind of network node which may comprise of a radio network node such as a radio access node (which can include a base station, radio base station, base transceiver station, base station controller, network controller, gNB, NR BS, evolved Node B (eNB), Node B, Multi-cell/multicast Coordination Entity (MCE), relay node, access point, radio access point, Remote Radio Unit (RRU), Remote Radio Head (RRH), a multi-standard BS (also known as MSR BS), etc.), a core network node (e.g., MME, SON node, a coordinating node, positioning node, MDT node, etc.), or even an external node (e.g., 3rd party node, a node external to the current network), etc. The network node may also comprise a test equipment.

In certain embodiments, network nodes 320 may interface with a radio network controller (not shown). The radio network controller may control network nodes 320 and may provide certain radio resource management functions, mobility management functions, and/or other suitable functions. In certain embodiments, the functions of the radio network controller may be included in the network node 320. The radio network controller may interface with the core network node 340. In certain embodiments, the radio network controller may interface with the core network node 340 via the interconnecting network 330.

The interconnecting network 330 may refer to any interconnecting system capable of transmitting audio, video, signals, data, messages, or any combination of the preceding. The interconnecting network 330 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node 340 may manage the establishment of communication sessions and various other functionalities for wireless devices 310. Examples of core network node 340 may include MSC, MME, SGW, PGW, O&M, OSS, SON, positioning node (e.g. E-SMLC), MDT node, etc. Wireless devices 310 may exchange certain signals with the core network node 340 using the non-access stratum layer. In non-access stratum signaling, signals between wireless devices 310 and the core network node 340 may be transparently passed through the radio access network. In certain embodiments, network nodes 320 may interface with one or more other network nodes over an internode interface. For example, network nodes 320 may interface each other over an X2 interface.

Although FIG. 1 illustrates a particular arrangement of network 300, the present disclosure contemplates that the various embodiments described herein may be applied to a variety of networks having any suitable configuration. For example, network 300 may include any suitable number of wireless devices 310 and network nodes 320, as well as any additional elements suitable to support communication between wireless devices or between a wireless device and another communication device (such as a landline telephone). The embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). While certain embodiments are described for NR and/or LTE, the embodiments may be applicable to any RAT, such as UTRA, E-UTRA, narrow band internet of things (NB-IoT), WiFi, Bluetooth, next generation RAT (NR, NX), 4G, 5G, LTE FDD/TDD, etc.

It should be noted that the terms "carrier activation or deactivation" or "carrier activation/deactivation" or "carrier (de)activation" can be used interchangeably in the following disclosure.

As mentioned above, the carrier activation or deactivation procedure uses the HARQ feedback as a confirmation mechanism of success or failure of the procedure. 3GPP TS. 36.212 specifies a place holder bit in the HARQ feedback sequence for all the configured DL carriers, whether they are activated or deactivated carriers. In other words, even though the UE knows that the eNB won't schedule any DL data on the deactivated carriers, the UE still has to maintain the place-holder (of 1 or 2 bits) in the HARQ feedback bit sequence for those deactivated carriers, just to keep the carrier aggregation HARQ feedback format aligned at the eNB and UE. By so doing, not only bit resources are wasted in the HARQ feedback sequence but also a misalignment or mismatch period about the number of configured carriers between the eNB and UE is generated.

Figure 2:
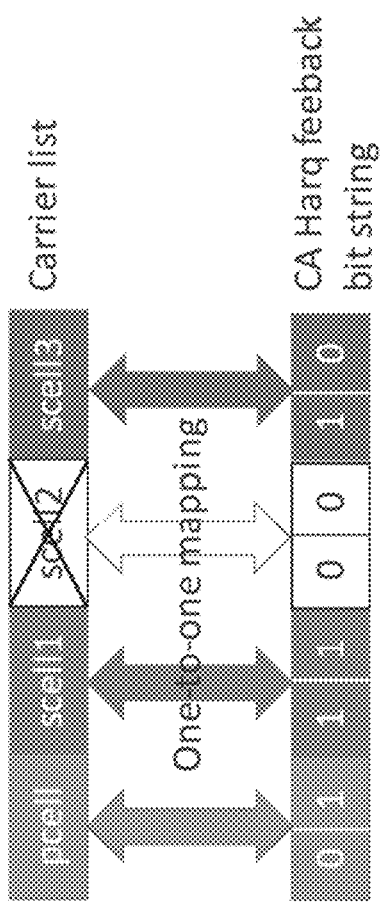
FIG. 2 illustrates the HARQ feedback bit sequence with place holders for the deactivated carriers.

For example, FIG. 2 shows a one-to one mapping between each carrier that is configured by the eNB 320 and its corresponding reserved bits in the HARQ feedback sequence or string of bits. In this example, the carrier 2, or secondary cell 2 (scell2), is deactivated. Although the UE 310 knows that the eNB 320 won't schedule any DL data on this deactivated carrier, the UE 310 still needs to reserve the corresponding bits in the HARQ feedback bit sequence for this deactivated carrier, which leads to a waste of valuable bit resources and to a decrement of the HARQ feedback code rate.

Figure 3:
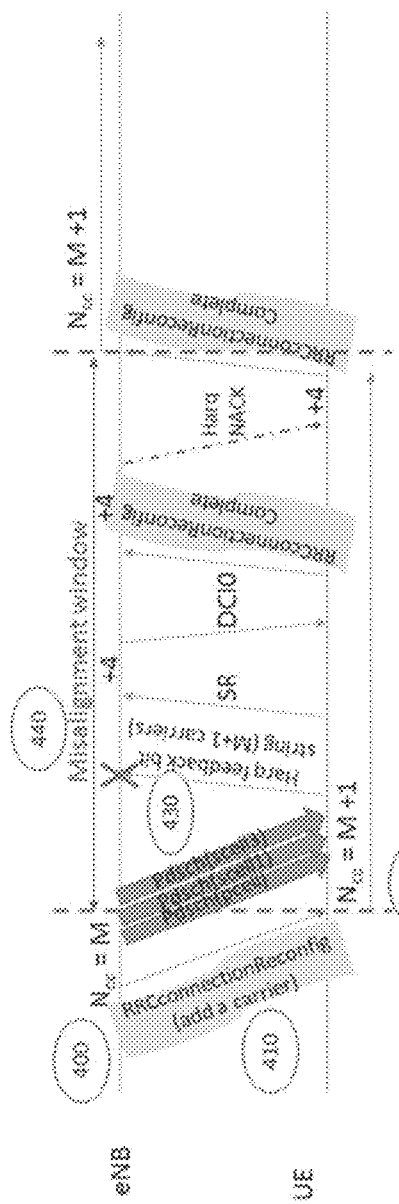
FIG. 3 illustrates a misalignment window between the eNB and the UE.

Furthermore, since the size of the HARQ feedback bit sequence is decided based on the configured carrier number (Ncc), the eNB 320 must keep alignment of Ncc with the UE, otherwise, the eNB will fail to decode the HARQ feedback. However, the configuration of a carrier is implemented through the two-handshaking RRC signaling, which can't guarantee an alignment between the eNB 320 and UE 310 all the time. FIG. 3 illustrates a misalignment window between the UE and the eNB.

For example, at the beginning at step 400, the number of carriers is Ncc=M, at the eNB and the UE, as such, the carrier number is aligned at the eNB and the UE. Then, the eNB sends a RRCConnectionReconfig message to the UE to add a new carrier (step 410). When the UE receives this message and decodes it successfully, it adds a new carrier and it increments Ncc by 1 such that the new Ncc=M+1 (step 420). At the UE's side, the UE needs to send to the eNB the RRCConnectionReconfigComplete message to acknowledge the receipt and successful decoding of the RRCConnectionReconfig message (step 430). From this time on (e.g. when the UE has decoded successfully the RRCConnectionReconfig message), the UE will use the new Ncc (M+1) to feedback the HARQ bits for the subsequent DL CA scheduling.

At the eNB side, after the eNB sent the RRCConnectionReconfig message out, the eNB cannot immediately increment its Ncc, since it has no idea if the UE has successfully received and decoded the RRC message. It has to wait until the corresponding RRC Complete message is received from the UE to do so. This means that the eNB still uses its current Ncc (M) to decode the HARQ feedback bit sequence for the subsequent DL CA scheduling until the RRC complete message is received (step 440). As such, a dynamic transient window (from the time of the UE's reception of the RRC reconfiguration message to the time of the eNB's reception of the RRC reconfiguration complete message) inevitably occurs. During this transient window, the eNB always uses a Ncc that is different from the Ncc used by the UE to decode the CA HARQ feedback bit sequence coming from the UE. This mismatched Ncc causes a HARQ feedback decoding failure and leads to a negative impact on the DL throughput, caused by unnecessary HARQ and RLC retransmissions.

Furthermore, since the RRC messages are also treated as the payload of the Signaling Radio Bear (SRB1) for RRC signaling, their transmission is exactly the same as the user data on the Data Radio Bear (DRB), which relies on the eNB's MAC layer scheduling result. So, it's impossible for the eNB to accurately predict the time when the UE will receive the RRCConnectionReconfig message and for the UE to estimate the time when the eNB will receive the RRCConnectionReconfigComplete message. As such, the above misalignment window is variable and hard to predict. Even worse, if the air interface interference causes BLER of the RRC complete message, more HARQ and even Radio Link Control (RLC) retransmissions are required, which will inevitably prolong the misalignment window (maximum to hundred milliseconds, for example).

It should be noted that the carrier deactivation/activation procedure is done through the Media Access Control (MAC) layer. However, the carrier configuration procedure is done through the RRC procedure, which has a RRC complete message as an explicit confirmation of the success of the procedure. Unlike the carrier configuration procedure, the carrier activation/deactivation procedure has no explicit confirmation at the MAC layer, instead it just relies on the HARQ ACK as response. Since the HARQ ACK has no CRC protection, its misinterpretation probability (of $10^{-2}$ is greatly larger than that of a CRC-protected RRC complete message ($<=10^{-6}$). This explains why the 3GPP TS. 36.212 specifies a place-holder for the deactivated carriers in the HARQ feedback bit sequence. If there were no place-holders for the deactivated carriers, once the HARQ feedback of the carrier activation or deactivation message meets the BLER, it will cause the eNB to misinterpret the HARQ feedback, such as from NACK to ACK for example. In such a case, the UE doesn't activate the carrier at all, but the eNB by mistake recognizes that the carrier has been activated. Then, the HARQ bit sequence size mismatch between the eNB and UE unexpectedly occurs. Even worse, the eNB has no way to detect such a misinterpretation, which will further result in disturbing all the subsequent DL CA scheduling until the MAC Control Element (MCE) for carrier activation/deactivation is retransmitted and correctly decoded by the UE.

In LTE for example, there are several communication sub-channels at the MAC layer. It implies that there is a MAC in-band signaling channel that carries special control information. This special MAC channel carrying the control information is called "MAC Control Element" or "MCE". This special MAC channel is implemented as a special Logical Channel Identity (LCID) field of the MAC Header.

It should be noted that the carrier activation or deactivation procedure is more frequent than the carrier configuration procedure.

Remove Place Holder Bits from the HARQ Feedback Bit Sequence

Embodiments of the present disclosure introduce a new HARQ feedback bit sequence which does not have a place holder for the deactivated carriers. By so doing, the resources are not wasted in the HARQ feedback bit sequence for the deactivated carriers.

Figure 4:
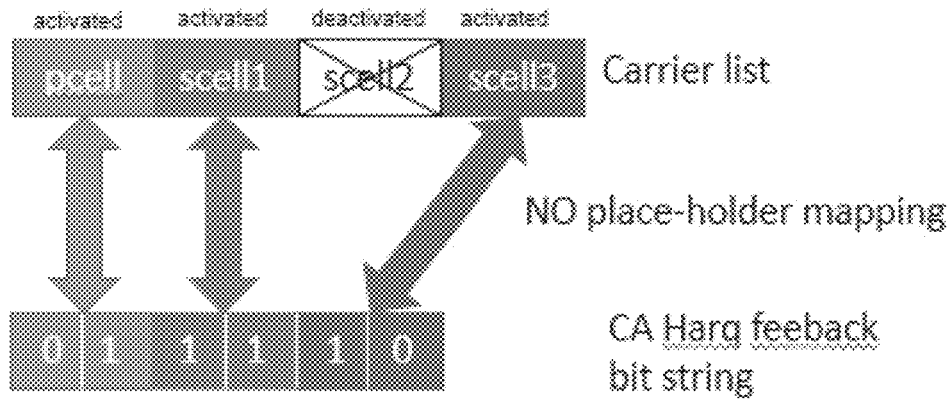
FIG. 4 illustrates the HARQ feedback bit sequence without the place holders for the deactivated carriers, according to an embodiment.

For example, in FIG. 4, the HARQ feedback bit sequence has bits reserved or maintained only for carriers that are activated, such as pcell, scell1 and scell3. Since scell2 is deactivated, it does not have corresponding reserved bits. Without a place-holder, the CA HARQ bit sequence can be shrunk, then its code rate can be decreased (by 20% per carrier, for example). Also, its decoding robustness can be improved. If the HARQ feedback happens to be multiplexed with PUSCH, its occupied RE resource number can be reduced, then there will be more RE resources for the PUSCH data whose UL throughput and decoding success rate can then be increased accordingly.

Furthermore, by removing the place holder bits corresponding to the deactivated carriers, the misalignment window, as described above, is eliminated.

A configured carrier always stays at the deactivated state until the eNB explicitly activates it through a MAC control element. The eNB won't activate the carrier until it receives the RRC complete message from UE. As such, both the eNB and UE share the same knowledge that the configured carrier will stay at the deactivated state before the eNB successfully receives the RRC complete message. Since the UE no longer reserves a place-holder in the CA HARQ feedback bit sequence for the newly configured (but deactivated) carriers, the eNB and UE are aligned on the CA HARQ feedback bit format and number of activated carriers.

With the removal of the place holder bits dedicated to the deactivated carriers, there is a need for a change of definition of the number of configured carriers used in the standard specification (3GPP): $N_{cells}^{DL}$.

In 3GPP 36.212 section 5.2.2.6, channel coding of control information, $N_{cells}^{DL}$ is defined as the following:

Set $N_{cells}^{DL}$ to the number of cells configured by higher layers for the UE.

With the teachings of the present disclosure, the above definition is modified as follows:

Set $N_{cells}^{DL}$ to the number of cells activated by higher layers for the UE.

As such, only the HARQ bits corresponding to the activated cells are concatenated into the HARQ bit sequence and input into the channel encoder. In other words, the deactivated cells/carriers no longer occupy place-holder bits in the HARQ bit sequence.

Reduce the Scope of Valid Values

Since the CA HARQ feedback has no Link Adaptation nor retransmission mechanism, it's difficult to further improve its robustness against the air interference using the existing methods. In order to increase the robustness of the HARQ feedback, some embodiments reduce the HARQ feedback content from 3 possible values (ACK/NACK/DTX) to 2 possible values (DTX/non-DTX). As such, the robustness of the carrier activation/deactivation procedure is improved.

In current systems, the eNB needs to distinguish three possible results during handling of the HARQ feedback: ACK, NACK and DTX. The more possible values the feedback can have, the lower is the robustness for decoding the HARQ feedback. If the valid value scope can be shrunk in decoding the HARQ feedback, the HARQ feedback BLER can be decreased to less than $10^{-3}$ for example. Also, the probability of misalignment between the eNB and UE for the activated carrier number can further be reduced.

The existing 3GPP standard has already provided up to 4 CA HARQ feedback resource candidates in the Information Element (IE): "PUCCH-ConfigDedicated-v1020", for the UE to use to send the HARQ feedback to the eNB. However, at any given DL CA scheduling, only one out of the four resources (indicated by the TPC field in the DCI) is chosen by the eNB to carry the CA HARQ feedback from the UE.

The configuration below shows the IE "PUCCH-ConfigDedicated-v1020".

the R bit of the MAC control element for carrier activation/deactivation, which is sent within the PDSCH of the primary cell (pcell), for example.

By providing a secondary UL bearing resource for the CA HARQ feedback, the eNB only needs to distinguish two valid values in the HARQ feedback handling: DTX (without power detection) and non-DTX (with power detection).

Figure 6:
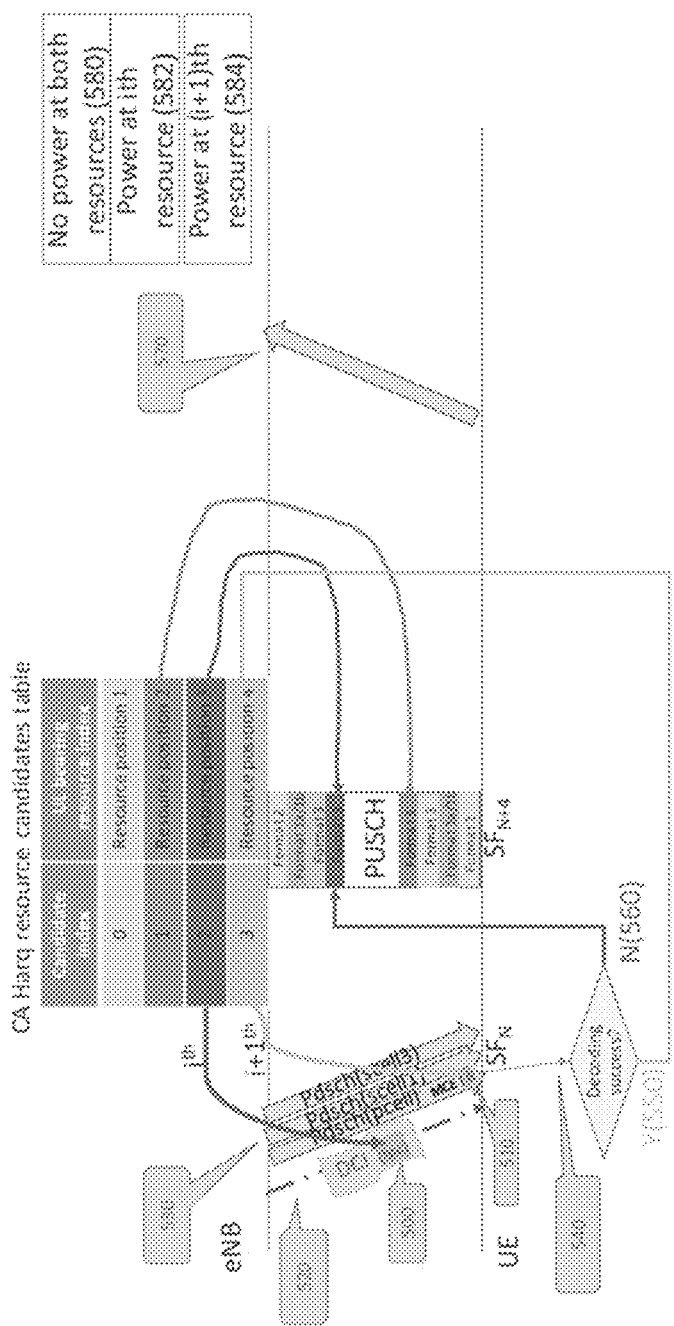
FIG. 6 illustrates a schematic diagram of the carrier activation or deactivation procedure using 2 resources for the HARQ feedback, according to an embodiment.

For example, when the eNB needs to activate or deactivate a CA carrier, the eNB tries to find 2 idle/available UL bearing resources from the 4 configured candidates, the ith resource as the primary resource and the i+1th resource as the secondary resource, for example. In FIG. 6, the ith resource corresponds to the resource with index 2 and the (i+1) th resource corresponds to the resource with index 3. Then, it puts the indication (e.g. index 2) to the ith resource into the TPC field of the current DCI and sets the R bit in the MCE to 1; otherwise, the R bit is set to 0. When the R bit is set to 1, it means that a secondary resource is available and corresponds to the next resource, i.e. (i+1)th or index 3 in the example of FIG. 6.

The eNB sends the DCI in a PDCCH to the UE, the DCI containing the indication to the ith resource in its TPC field (step 520). The eNB also sends downlink transmission in the already activated carriers, such as pcell, scell1 and scell3, using the PDSCH (step 530). In the PDSCH of the primary cell/carrier (pcell), the R bit of the MAC Control Element (MCE) is used as an indication of the second resource.

```
PUCCH-ConfigDedicated-v1020 ::=      SEQUENCE {
    pucch-Format-r10                 CHOICE {
        format3-r10                          SEQUENCE {
            n3PUCCH-AN-List-r10   SEQUENCE (SIZE (1..4) ) OF INTEGER   (0..549)   OPTIONAL,-
- Need ON
            twoAntennaPortActivatedPUCCH-Format3-r10        CHOICE {
                release                                  NULL,
                setup                                    SEQUENCE {
                    n3PUCCH-AN-ListP1-r10   SEQUENCE (SIZE (1..4) )  OF  INTEGER  (0..549)
                }
            }                                                               OPTIONAL--
Need ON
        },
```

In some embodiments of the present disclosure, two resources (instead of one) are provided from the pool of 4 candidates to the UE 310 for sending the HARQ feedback to the eNB 320. More specifically, in addition to the existing resource, there is provided one more resource from the candidates for the UE to feedback its HARQ bit sequence. For example, there is a reserved bit "R" in the existing activation/deactivation MAC control element. This reserved bit can be reused to indicate the secondary resource for the CA HARQ feedback.

Figure 5:
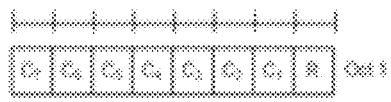
FIG. 5 illustrates the MAC control element for the carrier activation/deactivation command or message.

For example, in the existing MAC control elements, LCID=11011 is used for the activation or deactivation command or message. There is also an extended activation/deactivation command provided by 4 octets with LCID=11000. FIG. 5 shows the one octet structure, with a R bit reserved for future extension. This R bit can be reused in some embodiments to indicate the secondary HARQ feedback resource.

Furthermore, FIG. 6 illustrates the two resources used for sending one CA HARQ feedback. For example, the primary resource(ith) 500 is given by the Transmit Power Control (TPC) field of the DCI of the PDCCH, which is used to schedule the transmission of the activation or deactivation message. The secondary resource ((i+1)th) 510 is given by At the UE side, when the UE receives the DCI and the MCE, it will decode them (step 540). If the MCE is successfully decoded (step 550), the UE not only knows which carrier needs to be activated or deactivated, but also gets or identifies the R bit from the MCE. If the R bit is set to 1, the UE can then use the backup/secondary/second resources (e.g. (i+1)th) to feedback the HARQ ACK to the eNB. If the R bit is set to 0, it means that there is no secondary/second HARQ resource provided. As such, the UE can still use the original/primary/first resource (indicated by the TPC field of the DCI) to feedback the CA HARQ bit sequence, which can be an ACK or NACK. In other words, if the secondary/second resource is available, the eNB only needs to detect power at either the first resource or the second resource, i.e. power detected at the secondary resource means an ACK, and power detected at the primary/first resource means a NACK. If the secondary/second resource is unavailable, then, the UE can either send an ACK or NACK as feedback using the primary/first resource. Then the eNB needs to detect power at the first resource and also decode the content at the primary resource to know if an ACK or NACK was received.

If the UE fails to decode the MCE (step 560), the UE cannot access/identify the R bit, so it needs to use the original/primary/first resource (indicated by the TPC field of the DCI) to feedback the CA HARQ bit sequence, which can be an ACK or NACK.

At the eNB side, after the DCI is sent out, the eNB checks for UL reception power at both the ith (first) and (i+1)th (second) resources (step 570).

If no power is detected at either resources (step 580), it means that the DCI was missing or was not received. Therefore, the eNB needs to transmit the DCI again.

If power is detected at both resources, the resource with higher reception power is preferred.

If the resource with the higher reception power is the primary/first one, it means that the MCE decoding and activation/deactivation operation have failed (step 582). Then, the eNB needs to transmit the next Redundancy Version (RV) of the activation or deactivation message.

If the resource with the higher reception power is the secondary/second one, it means that the UE has successfully received the MCE and activated/deactivated the corresponding CA carrier (step 584). Then, the eNB can update safely the number of activated carriers accordingly.

As can be seen above, through the introduction of a secondary UL bearing resource, the discernable value scope of the HARQ feedback is successfully decreased from 3 values (ACK/NACK/DTX) to 2 values (non-DTX/DTX). The secondary UL resource is selected from the existing resource candidates. As such, not only the content transmitted on the UL resource is used to indicate HARQ feedback information, but the resource position itself (first or second resource) is also used to indicate such information, so that the transmitted content becomes more robust and can tolerate larger interferences.

Accordingly, the HARQ feedback misinterpretation is greatly reduced, at least by one order of magnitude ($<10^{-3}$). Also, the misalignment probability between the eNB and UE regarding the activated carrier number is also decreased to its minimum level.

Further, it should be noted that an advantage of this approach is that the robustness improvement doesn't add more resource consumption, since the current implementation has already pre-allocated/configured up to 4 resource candidates for each CA-UE (i.e. UE using Carrier Aggregation). The eNB just needs to find another idle/available resource from the candidate pool. Since one UE's candidate pool is randomly shared with other three CA-UEs, as long as the 4 multiplexed CA-UEs are not scheduled at the same TTI, there always exists at least one idle resource for a CA-UE to use in carrier activation/deactivation. Considering the large CA-UE number in real sites and the randomness of carrier activation/deactivation, there is a high probability to find a secondary resource for the carrier activation/deactivation process. The following example shows the high probability to find an idle backup resource.

Assume that a pair of PRBs are used for CA HARQ feedback. Each PRB can carry up to 5 resources for the HARQ feedback, so the 2 PRBs can carry 10 resources in total.

Since each UE can be allocated up to 4 resource candidates, the above 10 resources can support at most $$C_4^{10} = \frac{10 \times 9 \times 8 \times 7}{4 \times 3 \times 2 \times 1} = 210 \; CA \; UEs$$

(i.e. UEs that use CA). Accordingly, the 9 resources can support at most $$C_4^9 = \frac{9 \times 8 \times 7 \times 6}{4 \times 3 \times 2 \times 1} = 126 \; CA \; UEs.$$

Among the 210 CA UEs, the eNB can select up to 10 CA UEs for scheduling in each TTI. As long as the chosen 10 UEs' resource candidates are not constrained into any 9 resources, in other words, the 10 UEs' resource candidates cover all 10 resources, there always exists a method to guarantee each UE to get its own resource. The probability of having 10 UEs' resource candidates constrained into any 9 resources is $$10 \times \frac{C_4^{126}}{C_4^{210}} = 10 \times \frac{126 \times 125 \times \ldots \times 118 \times 117}{210 \times 209 \times \ldots \times 202 \times 201} \leq 10 \times 0.6^{10} = 0.06.$$

Accordingly, the probability of the 10 chosen UEs' resource candidates covering all 10 resources ≥1−0.06=0.94. That means that there is at least 94% probability for 10 scheduled UEs to have their own resources for their respective HARQ feedback.

If one CA UE needs to (de)activate its DL carrier, it needs 2 resources (1 primary and 1 backup) to reply with the HARQ feedback. As long as the eNB only schedules 9 instead of 10 CA UEs in one TTI, there is still 94% probability to guarantee that 2 resources are given to the UE under the (de)activating procedure and one resource is given to the remaining 8 normal CA UEs. Furthermore, even in the worst case, if the eNB can't find a secondary resource from the candidate pool, the present embodiments provide the backward compatibility by setting the R bit to "0".

Explicit Confirmation

The RRC procedure has an explicit acknowledgement (i.e. RRC complete message). All MAC control elements are unidirectional, which rely on either periodic transmissions (such as time alignment or Buffer Status Report (BSR)) or HARQ ACK (e.g. carrier activation/deactivation) to guarantee the reliability. However, all such existing approaches either cost a long time delay or provide lower reliability than the RRC message. The embodiments in this disclosure introduce the explicit acknowledgement in the MAC layer, which not only shortens the acknowledgment delay to a minimum of 5 TTIs to support fast synchronization, but also achieves the same reliability as the CRC-protected RRC messages. The new explicit acknowledgement together with the above enhanced HARQ feedback (two HARQ feedback resources) provides the double confirmation for the carrier activation/deactivation procedure.

The above two HARQ feedback resources for the carrier activation/deactivation procedure allow to decrease the HARQ misinterpretation rate to ($<=10^{-3}$). Actually, the explicit confirmation will allow the carrier activation/deactivation procedure to be as robust as the RRC complete message, which is CRC-protected and which has a BLER rate of $10^{-9}$.

In the current systems, there is no explicit acknowledgement of UE's successful reception of the carrier activation/deactivation procedure provided by the MAC control element (MCE) coming from the eNB. To provide the explicit confirmation, a new carrier state is introduced for the uplink transmission, using a MCE. When the DL CA activation/deactivation MCE is successfully decoded, the UE generates a UL carrier state MCE as the response for the previous activation/deactivation command and piggybacks it in the next PUSCH transmission to the eNB. Like the RRC complete message, the UL carrier state MCE is piggybacked in the PUSCH PDU, which also has the CRC protection, so such an explicit acknowledgement can provide the same reliability level as the RRC complete message.

In this way, even if the previous CA HARQ feedback was misinterpreted (for example, NACK→ACK) by the eNB due to a HARQ BLER, the eNB can still detect it later by sending the UE a UL scheduling grant (e.g. a DCI0). In response to the DCI0, the eNB receives the MCE carrier state from the PUSCH transmission. If the eNB finds that the corresponding bit in the UL carrier state MCE is 0, it means that the corresponding carrier is still inactivated. As such, the eNB can rollback the activated carrier number and retransmit another DL activation MCE to reactivate that carrier again.

Figure 7:
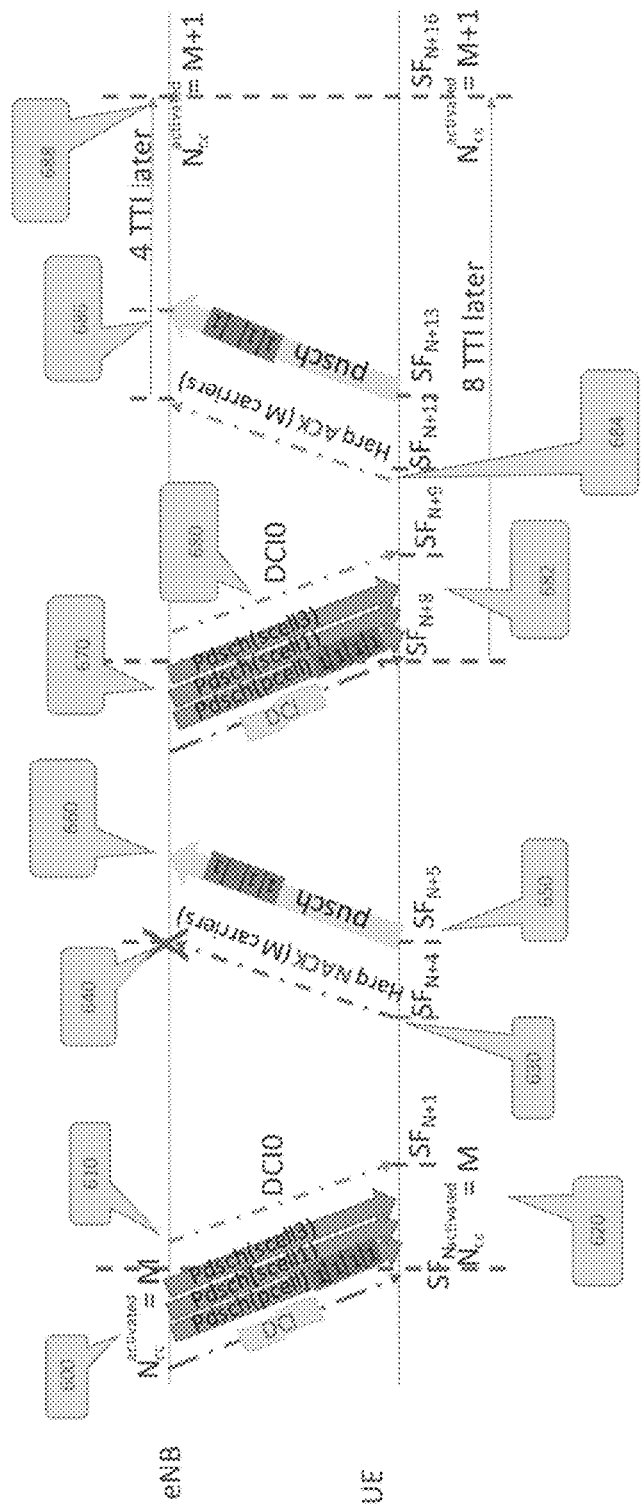
FIG. 7 illustrates a schematic diagram of the carrier activation or deactivation procedure with an explicit acknowledgement feedback, according to an embodiment.

FIG. 7 shows an example of how the UL carrier state can successfully override the previous misinterpreted HARQ feedback caused by BLER.

Generally stated, the eNB 320 makes the initial decision based on a received HARQ feedback from the UE 310. If it's an ACK, the eNB treats the previous operation as a success and prepares to change the carrier state to activated, 4 TTI later; otherwise, it treats the operation as a failure and prepares to repeat the previous operation again.

Let's assume that at the time of subframe N ($SF_N$), the eNB sends a DCI and a plurality of data downlink transmission scheduling (PDSCH) on the activated carriers to the UE (step 600). The PDSCH carries a MCE that provides the command to activate secondary cell 2 (scell2), for example. At this time ($SF_N$), the number of activated carriers (Ncc or $N_{cc}^{activated}$) is the same at the eNB and UE, i.e. $N_{cc}^{activated}=M$.

Due to possible BLER in the HARQ feedback response, the eNB does not wait for the HARQ feedback, but triggers the explicit confirmation procedure. At the next TTI, i.e. at $SF_{N+1}$, the eNB sends an uplink scheduling grant (DCI0) to the UE (step 610).

Let's assume that the UE fails to decode correctly the PDSCH (step 620). As such, at $SF_{N+4}$, it sends a NACK feedback to the eNB, using M as the number of activated carriers (step 630).

However, at the eNB side, the NACK feedback is misinterpreted as a ACK feedback, due to the HARQ BLER (step 640). So, the eNB will increment the number of activated carriers by one.

But at $SF_{N+5}$, in response to the received DCI0, the UE sends a data transmission on the PUSCH to the eNB (step 650). The PUSCH also includes a UL carrier state MCE. The MCE comprises a byte in which there is a bitmap for indicating the carrier state of each carrier with a corresponding bit. The bit is set to "1" to indicate an activated carrier. The bit is set to "0" to indicate a deactivated carrier. This information is piggybacked in the data transmission of the PUSCH.

In this case, the eNB receives the PUSCH and detects that the carrier state MCE is "0" for scell2 (step 660). This means that the carrier "scell2" is not activated yet. As such, the eNB overrides the received ACK feedback and initial decision, i.e. cancel the ongoing state change as well as rollback the activated carrier number; in other words, the eNB decrements the number of activated carriers by 1. Then, the eNB retransmits the previous activation/deactivation MCE at $SF_{N+8}$ (step 670). The eNB also transmits a plurality of data downlink schedulings (PDSCH) on the activated carriers to the UE (step 670). At $SF_{N+9}$, the eNB sends an uplink scheduling grant (DCI0) to the UE again (step 680).

Let's assume that the PDSCH is successfully decoded by the UE this time (step 682). At $SF_{N+12}$, the UE sends the ACK feedback to the eNB still using M as the number of activated carriers and will increment the number of activated carriers by one, 4 TTI later (step 684). At $SF_{N+13}$, the eNB receives the data transmission on the PUSCH, which also includes a UL carrier state MCE (step 686). The carrier state bit is set to "1" for scell2. As such, it is explicitly confirmed that the previous activation or deactivation command was successfully received and executed. Then, the eNB increments $N_{cc}^{activated}$ by 1 and starts scheduling on scell2 from $SF_{N+16}$ (step 688). At $SF_{N+16}$, the activated carrier number is aligned $N_{cc}^{activated}=M+1$) at the eNB and UE.

First Aspect: Methods in a Network Node

Figure 8:
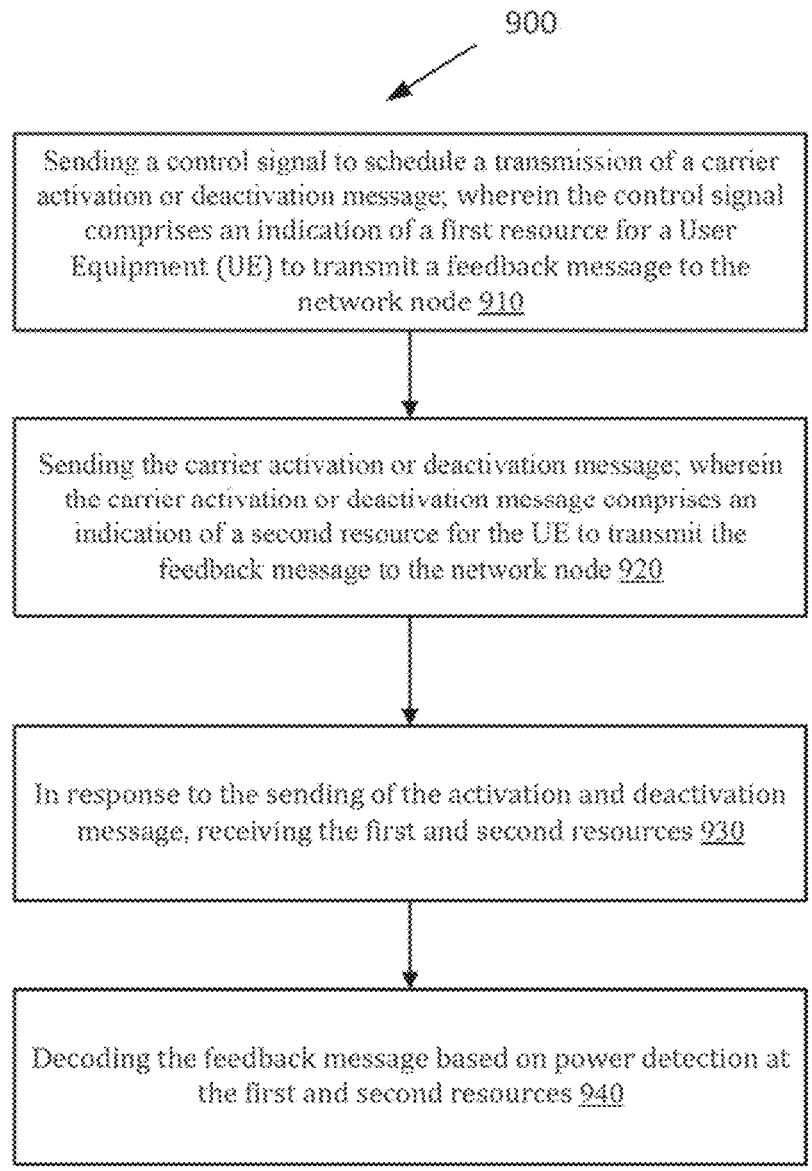
FIG. 8 illustrates a flow chart of a method in a network node, according to an embodiment.

FIG. 8 illustrates some embodiments of methods in a network node 320, such as an eNB, in accordance with a first aspect of the present disclosure.

Some embodiments of the method 900 according to this aspect comprise the following steps:

Step 910: Sending a control signal to schedule a transmission of a carrier activation or deactivation message, wherein the control signal comprises an indication of a first resource for the UE to transmit a feedback message to the network. The feedback message can be a HARQ feedback message, for example.

Step 920: Sending the carrier activation or deactivation message to the UE; wherein the carrier activation or deactivation message comprises an indication of a second resource for the UE to transmit the feedback message to the network node.

Step 930: In response to the sending of the activation or deactivation message, receiving the first and second resources.

Step 940: Decoding the feedback message based on power detection at the first and second resources.

Step 910

In this step, the eNB sends a DCI on a PDCCH for example, as the control signal to schedule the transmission of the carrier activation or deactivation message. The DCI includes a field in which an indication of the first resource to be used to feedback the feedback message (e.g. HARQ feedback message) to the eNB can be put. For example, if the UE fails to decode the carrier activation or deactivation message, the first resource is used by the UE to send the feedback message (e.g. HARQ feedback message). In this case, the feedback message is a negative message (or a negative acknowledgement). It should be noted that the eNB can use any other control signals which can include any types of fields which can allow the eNB to indicate a resource for the UE to send the feedback message, as will be appreciated by a person skilled in the art. Step 920

In this step, the eNB sends a plurality of data transmission schedulings on PDSCH, which includes a MAC Control Element (MCE) for carrying the carrier activation or deactivation message or command. The MCE comprises a R bit (e.g. a reserved bit), which is used as an indication of a second resource for the UE to transmit the feedback message (e.g. HARQ feedback message) to the eNB. For example, when the R bit is set to 1, the second resource is used by the UE to feedback the feedback message to the eNB. For instance, if the carrier activation or deactivation message is successfully decoded, the UE uses the second resource to send the positive feedback to the eNB. Prior to sending the carrier activation or deactivation message, the eNB may first allocate the second resource for carrying the feedback message. Also, the eNB may check with the UE if it has the ability to read or identify the second resource.

Step 930

In this step, the eNB receives the feedback message (e.g. HARQ feedback message) at first and second resources. It should be noted that according to an embodiment of the present disclosure, in the case of a HARQ feedback, the HARQ feedback comprises a bit sequence that has been modified to remove the place holder bits associated with the deactivated carriers. The new HARQ bit sequence has reserved bits only for the activated carriers.

Step 940

In this step, the eNB checks for reception power at both the first and second resources in order to decode the feedback message (e.g. HARQ feedback message). For example, if the eNB detects no power at either resources, it means that the control signal (e.g. DCI) was missing or was not received. Therefore, the eNB needs to transmit the control signal (e.g. DCI) again. If power is detected at both resources, the resource with the higher reception power is preferred. If the resource with the higher reception power is the first one (or if power is only detected at the first resource), it means that the MCE decoding and activation/deactivation operation have failed. Then, the eNB needs to transmit the next RV version of the activation or deactivation message. If the resource with the higher reception power is the second one (or if power is only detected at the second resource), it means that the UE has successfully received the MCE and activated/deactivated the corresponding CA carrier. Then, the eNB can update safely the number of activated carriers accordingly.

Furthermore, method 900 comprises receiving a uplink data packet from the UE, in response to sending a uplink scheduling grant to the UE, wherein the received data packet comprises an indication of a carrier state for each configured carrier, which allows to further confirm a success or failure of operation given by the activation or deactivation message. For example, the indication is given by a MCE, which can indicate explicitly the state of each configured carrier. As such, this indication can override a result of the decoding of the feedback message, if the result of the decoding of the feedback message is different from the indicated status of the configured carriers given by the MCE.

Second Aspect: Methods in a UE

FIG. 9 illustrates some embodiments of methods in a UE, such as a wireless device 310, in accordance with a second aspect of the present disclosure.

Some embodiments of the method 1000 according to this aspect comprise the following steps:

Step 1010: Receiving a control signal for a transmission of a carrier activation or deactivation message, the control signal including an indication of a first resource for the UE to transmit a feedback message to the network node.

Step 1020: Receiving the carrier activation or deactivation message; wherein the carrier activation or deactivation message comprises an indication of a second resource for the UE to transmit the feedback message to the network node.

Step 1030: Decoding the received activation or deactivation message.

Step 1040: Sending the feedback message using one of the first resource and the second resource based at least on a result of the decoding of the activation or deactivation message.

Step 1010

In this step, the UE receives a DCI on a PDCCH as the control signal for the transmission of the carrier activation or deactivation message. The DCI includes a field in which an indication of the first resource to be used to send the feedback message (e.g. the HARQ feedback) to the eNB can be put. For example, if the UE fails to decode the carrier activation or deactivation message, the first resource is used by the UE to send the feedback message to the eNB. In this case, a negative feedback is sent to the eNB.

Step 1020

In this step, the UE receives a plurality of data transmission schedulings on PDSCH, which includes a MAC Control Element (MCE) for carrying the carrier activation or deactivation message or command. The MCE can comprise a R bit, which can be used as an indication of the second resource for the UE to transmit the feedback message (e.g. HARQ) to the eNB. For example, when the R bit is set to 1, the second resource is used to feedback the HARQ to the eNB.

Step 1030

In this step, the UE decodes the received carrier activation or deactivation message. The result of the decoding can be a success or failure to decode the message.

Step1040

Based on the result of the decoding (see step 1030), the UE can use either the first or second resource to send the feedback message If the carrier activation or deactivation message is unsuccessfully decoded, the UE sends the feedback message using the first resource. If the carrier activation or deactivation message is successfully decoded and the second resource is available, i.e. R=1, the UE sends the feedback message using the second resource. It should be noted that in case the feedback message is a HARQ feedback, the HARQ feedback may comprises a bit sequence having place holder bits only for the corresponding activated carriers as shown in FIG. 4.

FIG. 10 illustrates a user equipment (UE) 310, which is an example wireless device. UE 310 includes an antenna 720, radio front-end circuitry 730, processing circuitry 710, and a computer-readable storage medium 740. Antenna 720 may include one or more antennas or antenna arrays, and is configured to send and/or receive wireless signals, and is connected to radio front-end circuitry 730. In certain alternative embodiments, UE 310 may not include antenna 720, and antenna 720 may instead be separate from UE 310 and be connectable to UE 310 through an interface or port.

The radio front-end circuitry 730 may comprise various filters and amplifiers, is connected to antenna 720 and processing circuitry 710, and is configured to condition signals communicated between antenna 720 and processing circuitry 710. In certain alternative embodiments, UE 310 may not include radio front-end circuitry 730, and processing circuitry 710 may instead be connected to antenna 720 without radio front-end circuitry 730.

Processing circuitry 710 may include one or more of radio frequency (RF) transceiver circuitry, baseband processing circuitry, and application processing circuitry. In some embodiments, the RF transceiver circuitry, baseband processing circuitry, and application processing circuitry may be on separate chipsets. In alternative embodiments, part or all of the baseband processing circuitry and application processing circuitry may be combined into one chipset, and the RF transceiver circuitry may be on a separate chipset. In still alternative embodiments, part or all of the RF transceiver circuitry and baseband processing circuitry may be on the same chipset, and the application processing circuitry may be on a separate chipset. In yet other alternative embodiments, part or all of the RF transceiver circuitry, baseband processing circuitry, and application processing circuitry may be combined in the same chipset. Processing circuitry 710 may include, for example, one or more central processing units (CPUs), one or more microprocessors, one or more application specific integrated circuits (ASICs), and/or one or more field programmable gate arrays (FPGAs).

In particular embodiments, some or all of the functionality described herein as being provided by a wireless device may be provided by the processing circuitry 710 executing instructions stored on a computer-readable storage medium 740. For example, the processing circuitry 710 is configured to perform method 1000 of FIG. 9.

In alternative embodiments, some or all of the functionality may be provided by the processing circuitry 710 without executing instructions stored on a computer-readable medium, such as in a hard-wired manner. In any of those particular embodiments, whether executing instructions stored on a computer-readable storage medium or not, the processing circuitry can be said to be configured to perform the described functionality. The benefits provided by such functionality are not limited to the processing circuitry 710 alone or to other components of UE 310, but are enjoyed by the wireless device or UE as a whole, and/or by end users and the wireless network generally.

Antenna 720, radio front-end circuitry 730, and/or processing circuitry 710 may be configured to perform any receiving operations described herein as being performed by a wireless device. Any information, data and/or signals may be received from a network node and/or another wireless device.

The processing circuitry 710 may be configured to perform any determining operations described herein as being performed by a wireless device (for example method 1000). Determining as performed by processing circuitry 710 may include processing information obtained by the processing circuitry 710 by, for example, converting the obtained information into other information, comparing the obtained information or converted information to information stored in the wireless device, and/or performing one or more operations based on the obtained information or converted information, and as a result of said processing making a determination.

Antenna 720, radio front-end circuitry 730, and/or processing circuitry 710 may be configured to perform any transmitting operations described herein as being performed by a wireless device. Any information, data and/or signals may be transmitted to a network node and/or another wireless device.

Computer-readable storage medium 740 is generally operable to store instructions, such as a computer program, software, an application including one or more of logic, rules, code, tables, etc. and/or other instructions capable of being executed by a processor. Examples of computer-readable storage medium 740 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processing circuitry 710. In some embodiments, processing circuitry 710 and computer-readable storage medium 740 may be considered to be integrated.

Alternative embodiments of UE 310 may include additional components beyond those shown in FIG. 10 that may be responsible for providing certain aspects of the UE's functionality, including any of the functionality described herein and/or any functionality necessary to support the solution described above. As just one example, UE 310 may include input interfaces, devices and circuits, and output interfaces, devices and circuits. Input interfaces, devices, and circuits are configured to allow input of information into UE 310, and are connected to processing circuitry 710 to allow processing circuitry 710 to process the input information. For example, input interfaces, devices, and circuits may include a microphone, a proximity or other sensor, keys/buttons, a touch display, one or more cameras, a USB port, or other input elements. Output interfaces, devices, and circuits are configured to allow output of information from UE 310, and are connected to processing circuitry 710 to allow processing circuitry 710 to output information from UE 310. For example, output interfaces, devices, or circuits may include a speaker, a display, vibrating circuitry, a USB port, a headphone interface, or other output elements. Using one or more input and output interfaces, devices, and circuits, UE 310 may communicate with end users and/or the wireless network, and allow them to benefit from the functionality described herein.

As another example, UE 310 may include power source 750. Power source 750 may comprise power management circuitry. Power source 750 may receive power from a power supply, which may either be comprised in, or be external to, power source 750. For example, UE 310 may comprise a power supply in the form of a battery or battery pack which is connected to, or integrated in, power source 750. Other types of power sources, such as photovoltaic devices, may also be used. As a further example, UE 310 may be connectable to an external power supply (such as an electricity outlet) via an input circuitry or interface such as an electrical cable, whereby the external power supply supplies power to power source 750. Power source 750 may be connected to radio front-end circuitry 730, processing circuitry 710, and/or computer-readable storage medium 740 and be configured to supply UE 310, including processing circuitry 710, with power for performing the functionality described herein.

UE 310 may also include multiple sets of processing circuitry 710, computer-readable storage medium 740, radio circuitry 730, and/or antenna 720 for different wireless technologies integrated into wireless device 310, such as, for example, GSM, WCDMA, LTE, NR, WiFi, or Bluetooth wireless technologies. These wireless technologies may be integrated into the same or different chipsets and other components within wireless device or UE 310 Other embodiments of wireless device 310 may include additional components beyond those shown in FIG. 10 that may be responsible for providing certain aspects of the wireless device's functionality, including any of the functionality described above and/or any additional functionality (including any functionality necessary to support the solution described above). As just one example, wireless device 310 may include input devices and circuits, output devices, and one or more synchronization units or circuits, which may be part of the one or more processors. Input devices include mechanisms for entry of data into wireless device 310. For example, input devices may include input mechanisms, such as a microphone, input elements, a display, etc. Output devices may include mechanisms for outputting data in audio, video and/or hard copy format. For example, output devices may include a speaker, a display, etc.

FIG. 11 is a block diagram of an exemplary network node 320, which can be a base station, or gNB, for example, in accordance with certain embodiments. The network node 320 includes processing circuitry 810, network interface 830 and one or more transceivers 820. The circuitry 810 may include one or more processors 840, and memory 850. In some embodiments, the transceiver 820 facilitates transmitting wireless signals to and receiving wireless signals from wireless device 310(e.g., via an antenna), the one or more processors 840 executes instructions to provide some or all of the functionalities described above as being provided by the network node 320, the memory 850 stores the instructions for execution by the one or more processors 840, and the network interface 830 communicates signals to backend network components, such as a gateway, switch, router, Internet, Public Switched Telephone Network (PSTN), core network nodes or radio network controllers, etc.

The one or more processors 840 may include any suitable combination of hardware and software implemented in one or more modules to execute instructions and manipulate data to perform some or all of the described functions of the network node 320, such as those described above, i.e. method 900 of FIG. 8. In some embodiments, the one or more processors 840 may include, for example, one or more computers, one or more central processing units (CPUs), one or more microprocessors, one or more applications, one or more application specific integrated circuits (ASICs), one or more field programmable gate arrays (FPGAs) and/or other logic. In certain embodiments, the one or more processors 840 may comprise one or more of the modules discussed below with respect to FIG. 12.

The memory 850 is generally operable to store instructions, such as a computer program, software, an application including one or more of logic, rules, algorithms, code, tables, etc. and/or other instructions capable of being executed by one or more processors 840. Examples of memory 850 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 830 is communicatively coupled to the one or more processors 840 and may refer to any suitable device operable to receive input for the network node 320, send output from the network node 320, perform suitable processing of the input or output or both, communicate to other devices, or any combination of the preceding. The network interface 830 may include appropriate hardware (e.g., port, modem, network interface card, etc.) and software, including protocol conversion and data processing capabilities, to communicate through a network.

Other embodiments of the network node 320 may include additional components beyond those shown in FIG. 11 that may be responsible for providing certain aspects of a network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Processors, interfaces, and memory similar to those described with respect to FIGS. 10-11 may be included in other network nodes (such as core network node 340). Other network nodes may optionally include or not include a wireless interface (such as the transceiver described in FIG. 11). Functionalities described may reside within the same radio node or network node or may be distributed across a plurality of radios nodes and network nodes.

FIG. 12 illustrates an example of the network nod 320 in accordance with certain embodiments. The network node 320 may include a first sending module 1310, a second sending module 1320, a receiving module 1330 and a decoding module 1340.

In certain embodiments, the first sending module 1310 may perform a combination of steps that may include steps such as Steps 910 in FIG. 8.

In certain embodiments, the second sending module 1320 may perform a combination of steps that may include steps such as Step 920 in FIG. 8.

In certain embodiments, the receiving module 1330 may perform a combination of steps that may include steps such as Step 930 in FIG. 8.

In certain embodiments, the decoding module 1340 may perform a combination of steps that may include steps such as Step 940 in FIG. 8.

In certain embodiments, the first sending module 1310, the second sending module 1320, the receiving module 1330 and the decoding module 1340 may be implemented using one or more processors, such as described with respect to FIG. 11. The modules may be integrated or separated in any manner suitable for performing the described functionality.

FIG. 13 illustrates an example of the UE 310 in accordance with certain embodiments. The UE 310 may include a first receiving module 1410, a second receiving module 1420, a decoding module 1430 and a sending module 1440.

In certain embodiments, the first receiving module 1410 may perform a combination of steps that may include steps such as Step 1010 in FIG. 9.

In certain embodiments, the second receiving module 1420 may perform a combination of steps that may include steps such as Step 1020 in FIG. 9.

In certain embodiments, the decoding module 1430 may perform a combination of steps that may include steps such as Step 1030 in FIG. 9.

In certain embodiments, the sending module 1440 may perform a combination of steps that may include steps such as Step 1040 in FIG. 9.

In certain embodiments, the first receiving module 1410, the second receiving module 1420, the decoding module 1430 and the sending module 1440 may be implemented using one or more processors (in the processing circuitry), such as described with respect to FIG. 10. The modules may be integrated or separated in any manner suitable for performing the described functionality.

It should be noted that according to some embodiments, virtualized implementations of the network node 320 of FIGS. 11 and 12 or wireless device 310 of FIGS. 10 and 13 are possible. As used herein, a "virtualized" network node (e.g., a virtualized base station or a virtualized radio access node) is an implementation of the network node in which at least a portion of the functionality of the network is implemented as a virtual component (e.g., via a virtual machine(s) executing on a physical processing node(s) in a network(s)). The functions of the wireless device 310 and network node 320 (described hereinabove) are implemented at the one or more processors 710 and 840 respectively or distributed across a cloud computing system. In some particular embodiments, some or all of the functions of the wireless device 310 and network node 320 (described herein) are implemented as virtual components executed by one or more virtual machines implemented in a virtual environment(s) hosted by processing node(s).

For example, turning to FIG. 14, there is provided an instance or a virtual appliance 1120 implementing the methods or parts of the methods of some embodiments. The instance runs in a cloud computing environment 1100 which provides processing circuit 1160 and memory 1190. The memory contains instructions 1195 executable by the processing circuit 1160 whereby the instance 1120 is operative to execute the methods or part of the methods previously described in relation to some embodiments.

The comprises a general-purpose network device including hardware 1130 comprising a set of one or more processor(s) or processing circuits 1160, which may be commercial off-the-shelf (COTS) processors, dedicated Application Specific Integrated Circuits (ASICs), or any other type of processing circuit including digital or analog hardware components or special purpose processors, and network interface controller(s) 1170 (NICs), also known as network interface cards, which include physical Network Interface 1180. The general-purpose network device also includes non-transitory machine readable storage media 1190-2 having stored therein software and/or instructions 1195 executable by the processor 1160. During operation, the processor(s) 1160 execute the software/instructions 1195 to instantiate a hypervisor 1150, sometimes referred to as a virtual machine monitor (VMM), and one or more virtual machines 1140 that are run by the hypervisor 1150.

A virtual machine 1140 is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 1140, and that part of the hardware 1130 that executes that virtual machine, be it hardware dedicated to that virtual machine and/or time slices of hardware temporally shared by that virtual machine with others of the virtual machine(s) 1140, forms a separate virtual network element(s) (VNE).

The hypervisor 1150 may present a virtual operating platform that appears like networking hardware to virtual machine 1140, and the virtual machine 1140 may be used to implement functionality such as control communication and configuration module(s) and forwarding table(s), this virtualization of the hardware is sometimes referred to as network function virtualization (NFV). Thus, NFV may be used to consolidate many network equipment types onto industry standard high volume server hardware, physical switches, and physical storage, which can be located in Data centers, and customer premise equipment (CPE). Different embodiments of the instance or virtual appliance 1120 may be implemented on one or more of the virtual machine(s) 1140, and the implementations may be made differently.

Embodiments herein disclosed present the following advantages.

Littler Resource Consumption and Higher HARQ Feedback Accuracy

In the present embodiments, only the activated carriers are allowed to occupy positions in the CA HARQ feedback bit sequence. The deactivated carriers no longer reserve the useless place-holder, which not only avoids the unnecessary resources waste (20% decrease of bit resource consumption per deactivated carrier), but also facilitates the higher HARQ feedback accuracy in TDD-CA.

For example, in TDD 3CC CA, the total needed HARQ bits number is 24 (3*2*4), which has exceeded the maximum capacity (20) of one bearing resource. The existing standard has to bundle the HARQ feedback of two codewords into one bit by applying the AND operation, which however loses the HARQ feedback accuracy (NACK of either codeword will retransmit both codewords). Applying the teachings of the disclosure, 8 bits are excluded for each deactivated carrier. So, the total bit number can be at least decreased to 16 (2*2*4). Then it doesn't need the bundling operation so that each codeword can have its own HARQ bit, which means that the NACKed codeword won't cause unnecessary retransmission of the ACKed codeword.

Completely Prevent HARQ Decoding Failure During the Carrier Configuration Procedure Due to the existence of the place-holder bits for the deactivated carriers in the HARQ feedback bit sequence, there always exists a transient window where the eNB and the UE are misaligned regarding the actual configured carrier number, which then inevitably introduces a mismatched HARQ feedback format between the eNB and UE. This mismatch causes failure of the HARQ retransmission mechanism and impacts all the subsequent CA scheduling. Also, the misalignment window is variable and unpredictable from the eNB's perspective, which then further increases the eNB's difficulty of resynchronization with the UE.

By excluding the deactivated carriers' place-holder bits from the CA HARQ bit sequence, the misalignment window during the carrier configuration procedure is totally eliminated. Furthermore, by providing a secondary HARQ feedback resource and an explicit MAC acknowledgement mechanism, the present embodiments not only achieve a higher robustness for the carrier activation/deactivation procedure, but also achieve a reliability as high as the CRC-protected RRC procedure.

The Robust HARQ Feedback and Fast (re)synchronization are General Methods Suitable for Other MAC Procedures Requiring High Frequency and Reliability Compared with the carrier configuration procedure, the carrier activation or deactivation procedure is more frequent due to fast air condition fluctuation and traffic burst. Moreover, it directly impacts the correct HARQ interpretation at the eNB side, since the carrier (de)activation (i.e. activation or deactivation) procedure will change the bit number in HARQ feedback bit sequence. However, since the MAC layer procedure lacks a guaranteed mechanism, once a HARQ BLER occurs, it will inevitably result in eNB misalignment with UE regarding the actual HARQ bit number and it will then mess up all the subsequent DL scheduling, or even cause RRC reestablishment.

The retrieval of an unused resource from the existing candidate pool as a backup resource in the carrier (de)activation procedure allow to decrease the HARQ feedback value scope from 3 to the minimum of 2, which guarantees a higher HARQ robustness. The fast synchronization mechanism can detect the HARQ BLER in a real-time way and recover the eNB from the misalignment state.

Another benefit is that the embodiments are general methods which can be applied to the other MAC procedures that require both frequent and reliable operations.

Any steps or features described herein are merely illustrative of certain embodiments. It is not required that all embodiments incorporate all the steps or features disclosed nor that the steps be performed in the exact order depicted or described herein. Furthermore, some embodiments may include steps or features not illustrated or described herein, including steps inherent to one or more of the steps disclosed herein.

Any two or more embodiments described in this document may be combined in any way with each other. Furthermore, the described embodiments are not limited to the described radio access technologies (e.g., LTE, NR). That is, the described embodiments can be adapted to other radio access technologies.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order. Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

Some of the Abbreviations used in this Disclosure Include:
ARQ Automatic Repeat Request
AWGN Additive White Gaussian Noise
BCCH Broadcast Control Channel
BCH Broadcast Channel
BLER BLock Error Rate
CA Carrier Aggregation
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DRX Discontinuous Reception
DTX Discontinuous Transmission
DTCH Dedicated Traffic Channel
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
GERAN GSM EDGE Radio Access Network
GSM Global System for Mobile communication
HARQ Hybrid Automatic Repeat Request
HO Handover
MIB Master Information Block
MME Mobility Management Entity
MSC Mobile Switching Center
NPDCCH Narrowband Physical Downlink Control CHannel
NR New Radio
OFDM Orthogonal Frequency Division Multiplexing
OFDMA Orthogonal Frequency Division Multiple Access
OSS Operations Support System
OTDOA Observed Time Difference of Arrival
O&M Operation and Mainatenance
PBCH Physical Broadcast Channel
P-CCPCH Primary Common Control Physical Channel
PCell Primary Cell
PDCCH Physical Downlink Control CHannel
PDSCH Physical Downlink Shared Channel
PGW Packet Gateway
PHICH Physical Hybrid-ARQ Indicator CHannel
PLMN Public Land Mobile Network
PMI Precoder Matrix Indicator
PRACH Physical Random Access CHannel
PUCCH Physical Uplink Control CHannel
PUSCH Physical Uplink Shared Channel
RRC Radio Resource Control
RSCP Received Signal Code Power
RSRP Reference Signal Received Power
RSRQ Reference Signal Received Quality
RSSI Received Signal Strength Indicator
RSTD Reference Signal Time Difference
RACH Random Access Channel
RAT Radio Access Technology
RNC Radio Network Controller
RNTI Radio Network Temporary Identifier
RRC Radio Resource Control
RRM Radio Resource Management
SCH Synchronization Channel
SCell Secondary Cell
SDU Service Data Unit
SFN System Frame Number
SGW Serving Gateway
SI System Information
SIB System Information Block
SNR Signal Noise Ratio
SON Self Optimized Network
TDD Time Division Duplex
TTI Transmission Time Interval
UE User Equipment
UL Uplink
UMTS Universal Mobile Telecommunication System
UTRA Universal Terrestrial Radio Access
UTRAN Universal Terrestrial Radio Access Network
WCDMA Wide CDMA
WLAN Wireless Local Area Network

What is claimed is:

1. A network node comprising a processing circuitry and a network interface connected thereto, the processing circuitry comprising a processor and a memory connected thereto, the memory comprising instructions that, when executed, cause the processor to:
send a control signal to schedule a transmission of a carrier activation or deactivation message, wherein the control signal comprises an indication of a first resource for a User Equipment (UE) to transmit a feedback message to the network node;

send the carrier activation or deactivation message, wherein the carrier activation or deactivation message comprises an indication of a second resource for the UE to transmit the feedback message to the network node;

in response to the sending of the activation and deactivation message, receive the feedback message at the first and second resources; and decode the feedback message based on power detection at the first and second resources.

2. The network node of claim 1, wherein the processor is further configured to detect power at the second resource, which means that a positive feedback for the carrier activation or deactivation message is received.

3. The network node of claim 2, wherein the processor is further configured to detect a power at the second resource higher than a power at the first resource.

4. The network node of claim 2, wherein the processor is further configured to update a number of activated carriers.

5. A method in a User Equipment (UE) for activation or deactivation of a carrier in a communication network supporting carrier aggregation, the method comprising:

receiving a control signal for a transmission of a carrier activation or deactivation message command, the control signal including an indication of a first resource for the UE to transmit a feedback message to a network node;

receiving a carrier activation or deactivation message, wherein the carrier activation or deactivation message comprises an indication of a second resource for the UE to transmit the feedback message to the network node;

decoding the received carrier activation or deactivation message; and sending the feedback message using one of the first resource and the second resource based at least on a result of the decoding of the carrier activation or deactivation message.

6. The method of claim 5, wherein the result of the decoding is a successful decoding of the carrier activation or deactivation message and a successful identification of the indication of the second resource.

7. The method of claim 6, wherein the successful identification of the indication of the second resource comprises detecting that the second resource is available.

8. The method of claim 7, wherein detecting that the second resource is available comprises detecting that a reserved bit R in a Media Access Control element of the carrier activation or deactivation message is set to 1.

9. A User Equipment (UE) comprising processing circuitry, and a network interface connected thereto, the processing circuitry configured to:

receive a control signal for a transmission of a carrier activation or deactivation message command, the control signal including an indication of a first resource for the UE to transmit a feedback message to a network node;

receive a carrier activation or deactivation message wherein the carrier activation or deactivation message comprises an indication of a second resource for the UE to transmit the feedback message to the network node;

decode the received carrier activation or deactivation message; and send the feedback message using one of the first resource and the second resource based at least on a result of the decoding of the carrier activation or deactivation message.

10. The UE of claim 9, wherein the processing circuitry is further configured to, in response to receiving an uplink scheduling grant, send an uplink data packet to the network node, the uplink data packet comprises an indication of a carrier state for each configured carrier for the UE, the carrier state used to confirm one of: a success and failure of an operation based on the carrier activation or deactivation message.

11. The UE of claim 10, wherein the indication of the carrier state is given by a Medium Access Control element.

12. The UE of claim 9, wherein the processing circuitry fails to decode the activation or deactivation message, and wherein, in response to such a result, the processing circuitry is further configured to transmit the feedback message to the network node using the first resource.

13. The UE of claim 9, wherein the processing circuitry fails to identify the indication of the second resource, and wherein, in response to such a failure, the processing circuitry is further configured to transmit the feedback message to the network node using the first resource.

14. The UE of claim 13, wherein the processing circuitry is further configured to detect that the second resource is unavailable.

15. The UE of claim 14, wherein the processing circuitry is further configured to detect that a reserved bit R in a Media Access Control element of the carrier activation or deactivation message is set to 0.

16. The UE of claim 9, wherein the processing circuitry is further configured to receive a next redundancy version of the carrier activation or deactivation message.

17. The UE of claim 9, wherein the processing circuitry is further configured to successfully decode the carrier activation or deactivation message and successfully identify the indication of the second resource.

18. The UE of claim 17, wherein the processing circuitry is further configured to detect that the second resource is available.

19. The UE of claim 18, wherein the processing circuitry is further configured to detect that a reserved bit R in a Media Access Control element of the carrier activation or deactivation message is set to 1.

20. The UE of claim 9, wherein the feedback message is a Hybrid Automatic Repeat Request (HARQ) feedback which comprises a bit sequence having bit placeholders only for corresponding activated carriers.

* * * * *